E. P. ALEXANDER.
METHOD OF MANUFACTURING HOES.
APPLICATION FILED JUNE 2, 1909.

994,492.

Patented June 6, 1911.

2 SHEETS—SHEET 1.

Witnesses

Inventor
Elmer P. Alexander.
By C. A. Snow & Co.
Attorneys

E. P. ALEXANDER.
METHOD OF MANUFACTURING HOES.
APPLICATION FILED JUNE 2, 1909.
994,492.
Patented June 6, 1911.
2 SHEETS—SHEET 2.
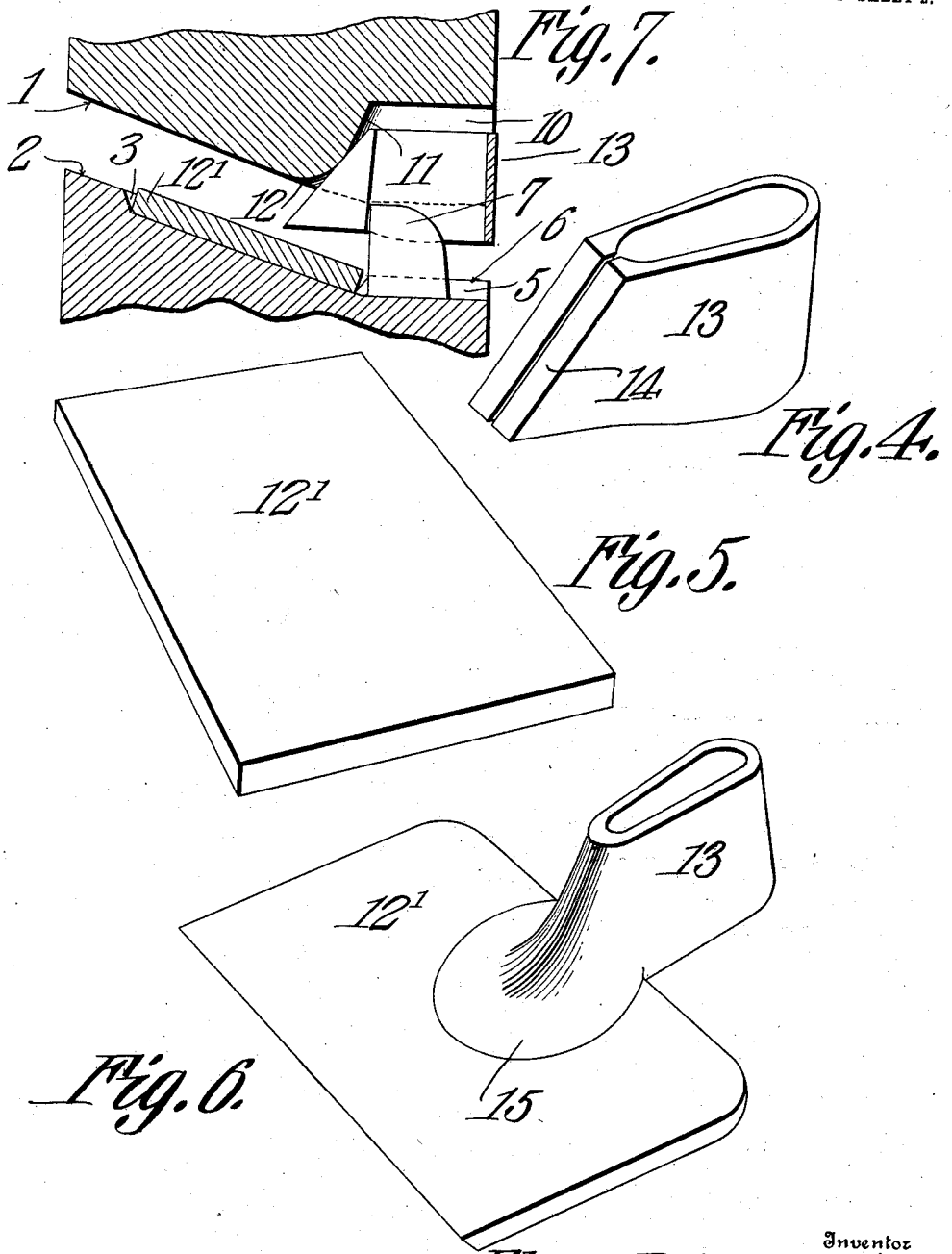
Witnesses
Inventor
Elmer P. Alexander
By C. A. Snow & Co.
Attorneys

UNITED STATES PATENT OFFICE.

ELMER P. ALEXANDER, OF LEWISTOWN, PENNSYLVANIA, ASSIGNOR OF ONE-HALF TO JAMES H. MANN, OF LEWISTOWN, PENNSYLVANIA.

METHOD OF MANUFACTURING HOES.

994,492.  Specification of Letters Patent.  Patented June 6, 1911.

Application filed June 2, 1909. Serial No. 499,669.

*To all whom it may concern:*

Be it known that I, ELMER P. ALEXANDER, a citizen of the United States, residing at Lewistown, in the county of Mifflin and State of Pennsylvania, have invented a new and useful Method of Manufacturing Hoes, of which the following is a specification.

This invention relates to a new and useful method of manufacturing hoes.

The principal object of the invention is to provide a method by means of which unfinished eye and blade blanks may be properly shaped or finished and securely connected with each other in a single simultaneous operation and with a single heating of the blanks.

Heretofore it has been customary to form the eye of the hoe upon eye forming rolls from a bar of metal, the ends of the said bar being brought together by the said rolls and then subsequently welded together so as to produce a thin round fin at the lower edge of the eye thus prepared. The bank for the blade has also heretofore been shaped with a scarf in its under side on one edge to partly accommodate the finished eye, and the corners of the blank have been given the proper shape desired for the finished hoe prior to the welding together of the blade blank and the eye blank. The method just described and heretofore practiced has been objectionable in the results for the reason that the blade would be spread under the pressure imparted thereto by the dies and would be given a rough edge, having a very ragged appearance, which made it necessary to again treat the article so as to give the edge the desired finish. The method heretofore practiced has been further objectionable for the reason that it consumed a great amount of time, and was, therefore, noticeably expensive. All these objections are overcome by my improved process in which the eye and the blade are welded together at the same time that the ends of the eye are joined and but one operation of the dies is necessary.

The novel features of my invention will be readily understood from the following description, taken in connection with the accompanying drawings, and will be particularly pointed out in the appended claim.

Figure 1:
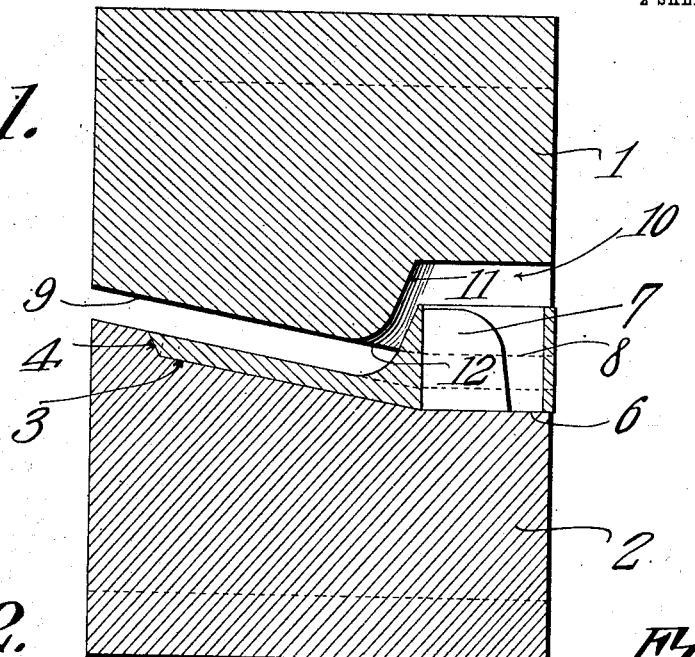
Figure 2:
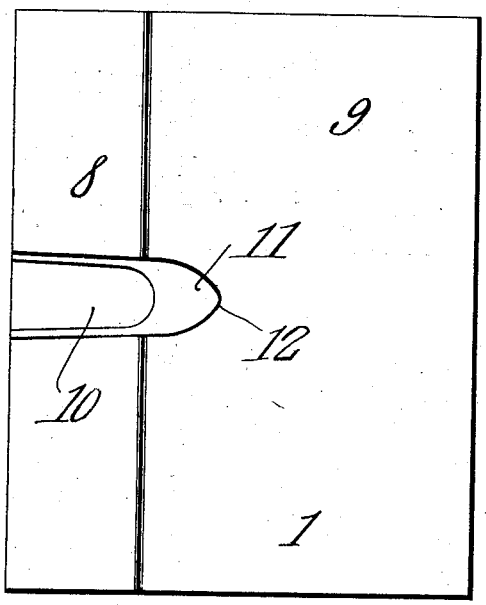
Figure 3:
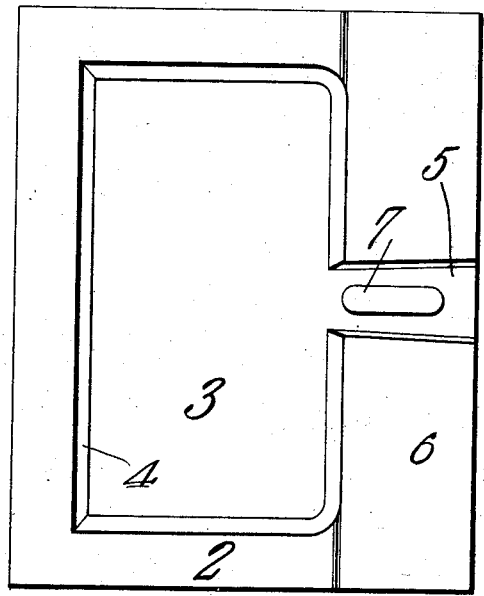

In the drawings, Figure 1 is a vertical section of a pair of dies showing a hoe in position therein, with the dies slightly separated as they would appear just after the welding has been accomplished. Fig. 2 is a bottom plan view of the upper die. Fig. 3 is a top plan view of the lower die. Fig. 4 is a perspective detail view of the eye as it appears just before being welded. Fig. 5 is a similar view of the blade. Fig. 6 is a similar view of the finished article. Fig. 7 is a transverse section of the dies, showing the blanks in position therein before being welded.

In the practice of my invention, I employ an upper die 1 and a lower die 2 which are counterparts in formation and are adapted to be used under a power hammer, as will be readily understood. The lower die is constructed with a recess 3 in its upper face and the said upper face of this die in the portion containing the said recess is inclined upward, as shown in Fig. 1, the recess being of the exact dimensions desired for the finished hoe blade. The walls of the recess are beveled, as indicated at 4, and the said recess communicates at the center of its lowest wall with a groove, 5, intended to receive the eye of the blade in the operation of welding. The upper surface of the die at the part occupied by this groove is horizontal, as indicated at 6, so that the eye and the blade will occupy the proper relative positions desired for the finished hoe and from the said horizontal portion 6 a tongue or lug 7 projects upward to enter and properly position the eye blank upon the die. The upper die has its lower face provided with a horizontal portion 8 and an inclined portion 9 adapted to fit against the horizontal and inclined portions of the lower die and at the center of the said die, within the horizontal portion of the same, is a cavity 10 of a proper height to accommodate the eye of the hoe, the front wall of the said cavity being concaved, as shown at 11, and inclined downward and toward the center of the die with its lower edge given a convex outline, as indicated at 12, to merge into the lower inclined surface of the die.

The blank 12′ for the blade of the hoe is, in the practice of my invention, cut from a rolled bar with rectangular edges as clearly shown in Fig. 5. The blank for the eye 13 is cut from a length of a rolled bar and being placed in a pair of shaping rolls is doubled on itself and its ends brought together, as indicated at 14 in Fig. 4, the said ends being given a beveled or inclined shape as clearly shown in said figure. The blanks 12' and 13 are then heated and placed in the lower die, as shown in Fig. 7, after which the upper die is brought down forcibly upon the heated blanks and as a result of the blow thus given the blanks, the ends of the eye will be joined and the eye will also be joined to the blade, the pressure and the shape of the dies causing the ends of the eye to be reduced and spread so as to form a fin 15, which will be firmly united to the blade, as indicated in Fig. 6. The pressure applied to the dies will also cause the edges of the blade blank to spread against the walls of the recess 3 in the lower die, and the said blade will be therey given the desired beveled finished edges and round corners.

It will be seen that by my method a single blow and a single welding operation joins all the parts and but one heating of the blanks is required.

Having thus described my invention, what I claim is:

A method of manufacturing hoes from roughly shaped blade blanks and roughly shaped eye blanks having separated ends containing an amount of metal in excess of that needed for the finished eye, which method consists in heating said blade and eye blanks, placing them together, and simultaneously finishing the blade, joining the ends of the eye blank, forming the excess metal of the ends of the eye blank into a fin, and welding said fin to the blade.

In testimony that I claim the foregoing as my own, I have hereto affixed my signature in the presence of two witnesses.

ELMER P. ALEXANDER.

Witnesses:
J. C. CLINGER,
W. CLARENCE SETTLE.

Copies of this patent may be obtained for five cents each, by addressing the "Commissioner of Patents, Washington, D. C."